United States Patent
Hijikata

(10) Patent No.: US 10,293,866 B2
(45) Date of Patent: May 21, 2019

(54) VEHICLE BOTTOM STRUCTURE

(71) Applicant: Toyota Jidosha Kabushiki Kaisha, Toyota-shi Aichi-ken (JP)

(72) Inventor: Kunihiro Hijikata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 8 days.

(21) Appl. No.: 15/846,759

(22) Filed: Dec. 19, 2017

(65) Prior Publication Data
US 2018/0201328 A1 Jul. 19, 2018

(30) Foreign Application Priority Data

Jan. 16, 2017 (JP) ................................ 2017-005073

(51) Int. Cl.
| | |
|---|---|
| *B60R 13/08* | (2006.01) |
| *B62D 25/20* | (2006.01) |
| *B62D 35/02* | (2006.01) |
| *B62D 27/06* | (2006.01) |

(52) U.S. Cl.
CPC ...... *B62D 25/2072* (2013.01); *B60R 13/0861* (2013.01); *B60R 13/0876* (2013.01); *B62D 27/065* (2013.01); *B62D 35/02* (2013.01); *B60Y 2410/114* (2013.01); *Y02T 10/82* (2013.01); *Y02T 10/88* (2013.01)

(58) Field of Classification Search
CPC .. B62D 25/2072; B62D 27/065; B62D 35/02; B60R 13/0876; B60R 13/0861; Y02T 10/88; Y02T 10/82; B60Y 2410/114

USPC ............................................ 296/193.07, 209
See application file for complete search history.

(56) References Cited

U.S. PATENT DOCUMENTS

| | | | | |
|---|---|---|---|---|
| 5,195,607 A | * | 3/1993 | Shimada | ................ B60K 13/04 180/296 |
| 5,555,932 A | * | 9/1996 | Dudley | ............... B60R 13/0861 165/10 |
| 5,981,082 A | * | 11/1999 | Pirchl | ..................... F16L 59/07 228/59 |
| 7,972,708 B2 | * | 7/2011 | Schweiggart | ....... B60R 13/0838 181/284 |

(Continued)

FOREIGN PATENT DOCUMENTS

JP 2015214314 A 12/2015

*Primary Examiner* — Pinel E Romain
(74) *Attorney, Agent, or Firm* — Dinsmore & Shohl LLP

(57) ABSTRACT

A vehicle bottom structure includes heat shield plate, which is arranged between a vehicle component and an exhaust pipe, and two undercovers, which are arranged on the opposite sides of the exhaust pipe in the vehicle width direction. The heat shield plate has a covering portion, two heat-shield-plate fastened portions, and two heat-shield-plate coupling portions. The covering portion covers the exhaust pipe. The heat-shield-plate fastened portions are each fastened to the corresponding one of the undercovers. The heat-shield-plate coupling portions each couple a corresponding lower end of the covering portion to the corresponding one of the heat-shield-plate fastened portions. Each heat-shield-plate coupling portion includes a section that has a shape that becomes higher toward the corresponding undercover in the vehicle width direction. The heat-shield-plate fastened portions are each located above the corresponding lower end of the covering portion.

5 Claims, 4 Drawing Sheets

(56) References Cited

U.S. PATENT DOCUMENTS

| 7,997,376 B2* | 8/2011 | Fujita | B60K 13/04 |
| | | | 180/296 |
| 8,668,248 B2* | 3/2014 | Ishizono | B62D 25/025 |
| | | | 296/187.08 |

* cited by examiner

VEHICLE BOTTOM STRUCTURE

CROSS-REFERENCE TO RELATED APPLICATIONS

This application claims priority to Japanese Patent Application No. 2017-005073 filed Jan. 16, 2017, which is incorporated herein by reference.

BACKGROUND

The present disclosure relates to a vehicle bottom structure that includes an undercover.

Japanese Laid-Open Patent Publication No. 2015-214314 discloses an example of a vehicle bottom structure that includes a heat shield plate, which is arranged between the exhaust pipe and a vehicle component located above the exhaust pipe, and two undercovers, which are arranged on the opposite sides of the exhaust pipe in the vehicle width direction. In the vehicle bottom structure, the opposite ends of the heat shield plate in the vehicle width direction are each fastened to the corresponding one or the undercovers.

If the fastened portions of the undercovers and the heat shield plate are arranged close to the exhaust pipe, the fastened portions are exposed to the heat released from the exhaust pipe, which promotes the deterioration over time of the fastened portions. Therefore, to restrict the influence of the heat from the exhaust pipe on the fastened portions, the fastened portions are typically arranged at positions separated from the exhaust pipe in the vehicle width direction.

Specifically, the greater the surface area of the lower surface of each undercover, the more improved becomes the aerodynamic performance of the vehicle. However, if the undercovers are enlarged to increase the surface area of the lower surface of each undercover, the end of the undercover closer to the exhaust pipe in the vehicle width direction becomes closer to the exhaust pipe. In this case, the aforementioned fastened portions are arranged close to the exhaust pipe and the influence of the heat from the exhaust pipe on the fastened portions is increased.

SUMMARY

In accordance with one aspect of the present disclosure, a vehicle bottom structure is provided that includes a heat shield plate, which is arranged between an exhaust pipe and a vehicle component located above the exhaust pipe, and two undercovers that are arranged on opposite sides of the exhaust pipe in a vehicle width direction. The heat shield plate includes a covering portion, which is arranged along an outer circumference of the exhaust pipe and covers the exhaust pipe, two heat-shield-plate fastened portions, and two heat-shield-plate coupling portions. Each heat-shield-plate fastened portion is arranged at a position closer to the corresponding one of the undercovers than the covering portion in the vehicle width direction and is fastened to the undercover. Each heat-shield-plate coupling portions couples a corresponding one of lower ends of the covering portion to an end of the corresponding one of the heat-shield-plate fastened portions that is closer to one covering portion in the vehicle width direction. Each heat-shield-plate coupling portion includes a section that has a shape that becomes higher toward the corresponding undercover in the vehicle width direction. The heat-shield-plate fastened portions are located above the lower ends of the covering portion.

Other aspects and advantages of the present disclosure will become apparent from the following description, disclosure in conjunction with the accompanying drawings, illustrating by way of example the principles of the disclosure.

BRIEF DESCRIPTION OF THE DRAWINGS

The present disclosure, together with objects and advantages thereof, may best be understood by reference to the following description of the present embodiments together with the accompanying drawings in which.

DETAILED DESCRIPTION OF THE EMBODIMENTS

A vehicle bottom structure according to one embodiment will now be described with reference to FIGS. 1 to 3.

Figure 1:
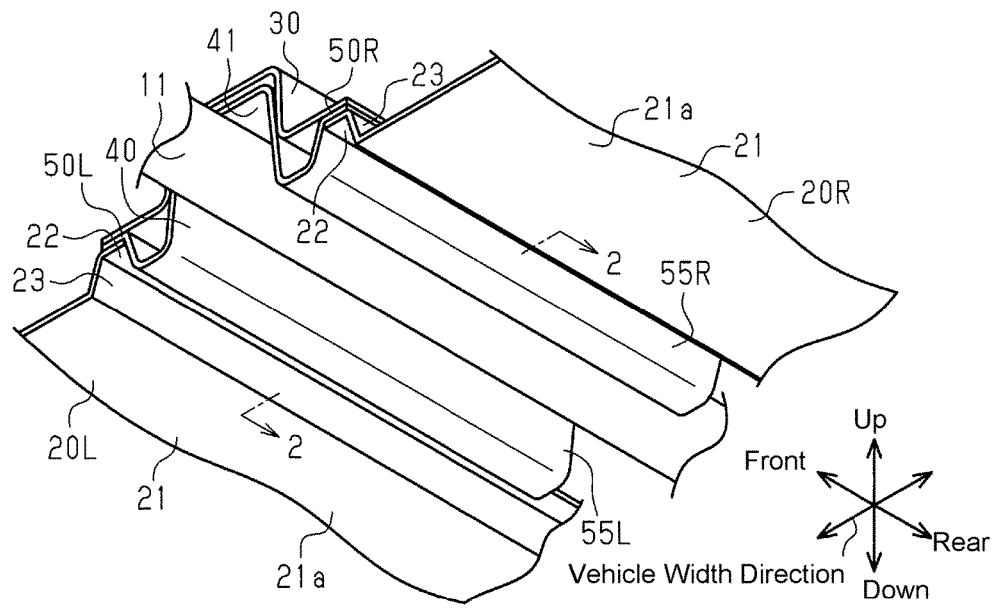
FIG. 1 is a perspective view from below of a vehicle bottom structure according to one embodiment.
Figure 2:
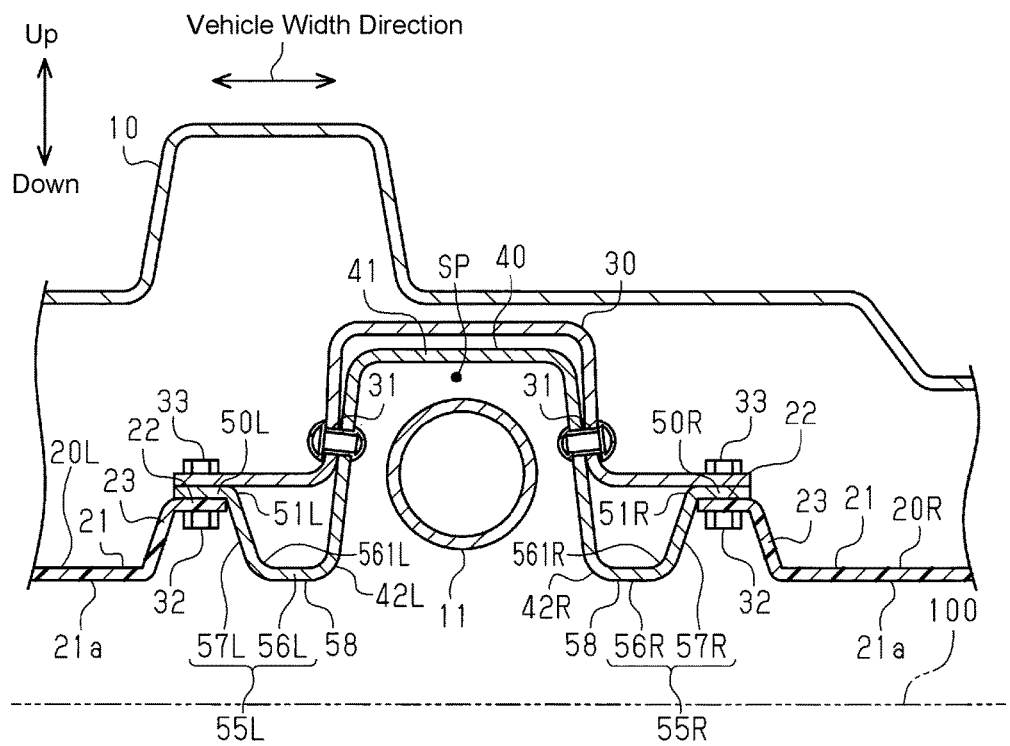
FIG. 2 is a cross-sectional view taken along arrow 2-2 of FIG. 1.
Figure 3:
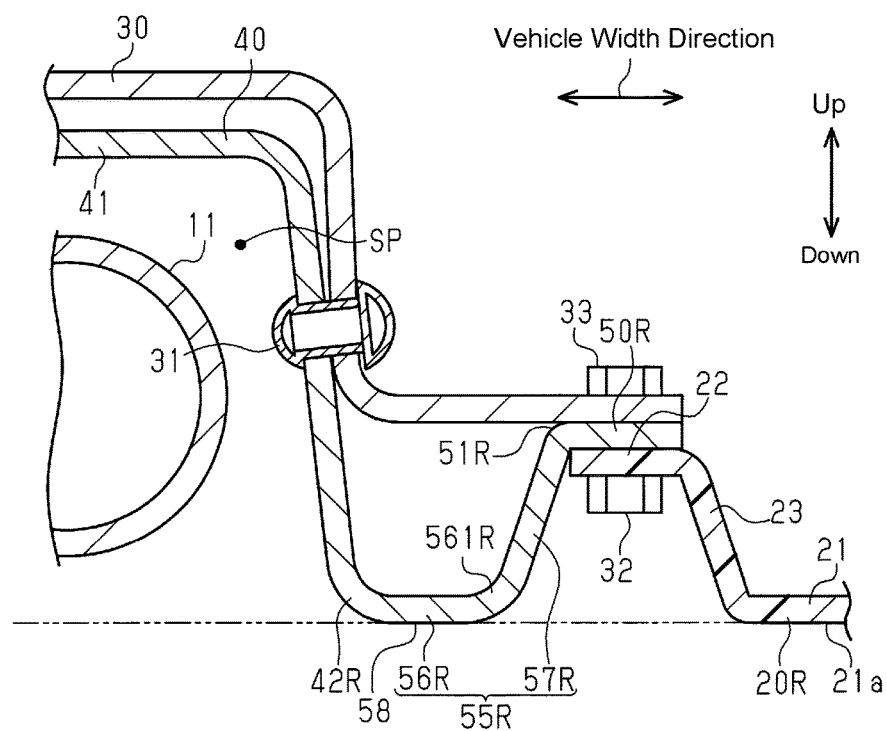
FIG. 3 is an enlarged view of a part of FIG. 2.

As shown in FIGS. 1 and 2, the vehicle bottom structure includes a heat shield plate 40, which is arranged between an exhaust pipe 11 and a vehicle component located above the exhaust pipe 11, and two undercovers 20R, 20L. Specifically, the heat shield plate 40 is arranged between a floor panel 10, which defines the passenger compartment of the vehicle, and the exhaust pipe 11 of the engine, which extends in the vehicle front-rear direction. The undercovers 20R, 20L are arranged on the opposite sides of the heat shield plate 40 in the vehicle width direction. In the present embodiment, the floor panel 10 corresponds to the vehicle component located above the exhaust pipe 11. One of the undercovers 20R, 20L that is located on the right side of the exhaust pipe 11 as viewed in FIG. 2 is defined as the undercover 20R. The other one of the undercovers 20R, 20L, which is located on the left side of the exhaust pipe 11 as viewed in FIG. 2, is defined as the undercover 20L.

With reference to FIG. 2, the vehicle bottom structure also has a retainer 30, which is arranged between the heat shield plate 40 and the floor panel 10. The retainer 30 is fixed to the heat shield plate 40 by means of clips 31. The right end of the heat shield plate 40 and the right end of the retainer 30 as viewed in FIG. 2 are fastened to the undercover 20R by means of a bolt 32 and a nut 33, which are examples of fastening members. Similarly, the left end of the heat shield plate 40 and the left end of the retainer 30 as viewed in FIG. 2 are fastened to the undercover 20L by means of another bolt 32 and another nut 33, which also are examples of fastening members.

As illustrated in FIGS. 1 and 2, the undercovers 20R, 20L each have a cover body 21, a cover fastened portion 22, and a cover coupling portion 23. The cover fastened portion 22 is arranged at a position closer to the exhaust pipe 11 than the cover body 21 in the vehicle width direction and is fastened to the heat shield plate 40 and the retainer 30. The cover coupling portion 23 couples the cover body 21 to the cover fastened portion 22. The cover body 21 has a flat lower surface 21a, which is opposed to a road surface 100 on which the vehicle travels. The road surface 100 is represented by the long dashed double-short dashed line in FIG. 2. The cover body 21 is arranged below the cover fastened portion 22, specifically, below the lower end of the corresponding bolt 32.

Referring to FIGS. 1 and 2, the heat shield plate 40 extends in the vehicle front-rear direction and is configured to limit the transfer of the heat released from the exhaust pipe 11 to the floor panel 10. The heat shield plate 40 includes a covering portion 41 and two heat-shield-plate fastened portions 50R, 50L. The covering portion 41 is arranged along the outer circumference of the exhaust pipe 11 and covers the exhaust pipe 11. The heat-shield-plate fastened portion 50R is arranged at a position closer to the undercover 20R than the covering portion 41 in the vehicle width direction. The heat-shield-plate fastened portion 50L is arranged at a position closer to the undercover 20L than the covering portion 41 in the vehicle width direction. The heat shield plate 40 also has a heat-shield-plate coupling portion 55R, which couples the covering portion 41 to the heat-shield-plate fastened portion 50R, and a heat-shield-plate coupling portion 55L, which couples the covering portion 41 to the heat-shield-plate fastened portion 50L. Specifically, the heat-shield-plate coupling portion 55R couples a lower end 42R (the right lower end as viewed in FIG. 2) of the covering portion 41, which is closer to the undercover 20R, to an end 51R (the left end as viewed in the drawing) of the heat-shield-plate fastened portion 50R, which is closer to the exhaust pipe 11, in the vehicle width direction. The heat-shield-plate coupling portion 55L couples a lower end 42L (the left lower end as viewed in FIG. 2) of the covering portion 41, which is closer to the undercover 20L, to an end 51L (the right end as viewed in the drawing) of the heat-shield-plate fastened portion 50L, which is closer to the exhaust pipe 11.

The covering portion 41 is formed to cover the exhaust pipe 11. That is, the exhaust pipe 11 extends through a space SP, which is defined by the covering portion 41, in the vehicle front-rear direction. With reference to FIGS. 2 and 3, the lower ends 42R, 42L of the covering portion 41 are each located below both the lower end of the exhaust pipe 11 and the lower ends of the bolts 32.

The heat-shield-plate fastened portions 50R, 50L are arranged above the lower ends 42R, 42L of the covering portion 41. The heat-shield-plate fastened portion 50R is fastened to the cover fastened portion 22 of the undercover 20R. The heat-shield-plate fastened portion 50L is fastened to the cover fastened portion 22 of the undercover 20L.

The heat-shield-plate coupling portion 55R has a first coupling section 56R and a second coupling section 57R, which couple the covering portion 41 to the undercover 20R. The first coupling section 56R extends from the lower end 42R of the covering portion 41 toward the undercover 20R in the vehicle width direction. The second coupling section 57R couples an end 561R of the first coupling section 56R closer to the undercover 20R in the vehicle width direction to an end 51R of the heat-shield-plate fastened portion 50R closer to the covering portion 41 in the vehicle width direction. The second coupling section 57R corresponds to a section of the heat-shield-plate coupling portion 55R that has a shape that becomes higher toward the undercover 20R in the vehicle width direction.

Similarly, the heat-shield-plate coupling portion 55L has a first coupling section 56L and a second coupling section 57L, which couple the covering portion 41 to the undercover 20L. The first coupling section 56L extends from the lower end 42L of the covering portion 41 toward the undercover 20L in the vehicle width direction. The second coupling section 57L couples an end 561L of the first coupling section 56L closer to the undercover 20L in the vehicle width direction to an end 51L of the heat-shield-plate fastened portion 50L closer to the covering portion 41 in the vehicle width direction. The second coupling section 57L corresponds to a section of the heat-shield-plate coupling portion 55L that has a shape that becomes higher toward the undercover 20L in the vehicle width direction.

The first coupling sections 56R, 56L each have a flat lower surface 58. The lower surfaces 58 of the first coupling sections 56R, 56L are parallel to the lower surfaces 21a of the cover bodies 21. Referring to FIG. 2, both the lower surfaces 58 of the first coupling sections 56R, 56L and the lower surfaces 21a of the cover bodies 21 are parallel to the road surface 100, on which the vehicle travels. As represented by the long dashed double-short dashed line in FIG. 3, the positions of the lower surfaces 58 of the first coupling sections 56R, 56L are the same as the positions of the lower surfaces 21a of the cover bodies 21 in the vertical direction.

An operation of the vehicle bottom structure will now be described together with the advantages.

The lower ends 42R, 42L of the covering portion 41 of the heat shield plate 40, which covers the exhaust pipe 11, are arranged below the heat-shield-plate fastened portions 50R, 50L and below the lower ends of the bolts 32, which are used to fasten the heat-shield-plate fastened portions 50R, 50L to the undercovers 20R, 20L. The covering portion 41 is thus arranged between the exhaust pipe 11 and the fastened portion of the heat shield plate 40 and the undercovers 20R, 20L. This prevents the fastened portions from being directly exposed to the heat released from the exhaust pipe 11. As a result, even if the undercovers 20R, 20L are enlarged such that the ends of the undercovers 20R, 20L closer to the exhaust pipe 11 in the vehicle width direction become closer to the exhaust pipe 11, the influence of the heat from the exhaust pipe 11 on the fastened portions is is not increased. Therefore, while limiting the increase of the influence of the heat from the exhaust pipe 11 on the fastened portions, the surface area of the lower surface 21a of the cover body 21 of each undercover 20R, 20L is increased.

In the present embodiment, the lower surface 21a of the cover body 21 of each undercover 20R, 20L, which is opposed to the road surface 100, is arranged below the cover fastened portion 22, which is a fastening position with respect to the heat shield plate 40. More specifically, the lower surfaces 21a of the cover bodies 21 are arranged below the lower ends of the bolts 32. Also, the lower surfaces 58 of the first coupling sections 56R, 56L of the heat shield plate 40 are arranged below the lower ends of the bolts 32. The bolts 32 thus do not project below the lower surface of the vehicle bottom structure. Specifically, the bolts 32 project neither below the lower surfaces 21a of the undercovers 20R, 20L nor below the lower surfaces 58 of the first coupling sections 56R, 56L. This decreases unevenness of the section of the vehicle that is opposed to the road surface 100, thus improving the aerodynamic performance of the vehicle.

The vehicle bottom structure according to the present embodiment includes, as flat surfaces opposed to the road surface 100, not only the lower surfaces 21a of the cover bodies 21 of the undercovers 20R, 20L but also the lower surfaces 58 of the first coupling sections 56R, 56L, which are located between the lower ends 42R, 42L of the covering portion 41 and the heat-shield-plate fastened portions 50R,

50L. This increases the surface areas of the flat surfaces opposed to the road surface 100 and thus improves the aerodynamic performance of the vehicle.

Also, the positions of the lower surfaces 58 of the first coupling sections 56R, 56L are the same as the positions of the lower surfaces 21a of the cover bodies 21 of the undercovers 20R, 20L in the vertical direction. This decreases unevenness in the lower section of the vehicle, which is opposed to the road surface 100, and thus correspondingly limits turbulence between the lower section of the vehicle and the road surface 100. As a result, the aerodynamic performance of the vehicle is improved.

The heat shield plate 40 has ridges in the boundary portions between the covering portion 41 and the first coupling sections 56R, 56L, the boundary portions between the first coupling sections 56R, 56L and the second coupling sections 57R, 57L, and the boundary portions between the second coupling sections 57R, 57L and the heat-shield-plate fastened portions 50R, 50L. Increasing the number of the ridges formed in the heat shield plate 40 increases the rigidity of the heat shield plate 40 when load is applied to the heat shield plate 40 in the vehicle front-rear direction.

The above-described embodiment may be modified as follows.

Figure 4:
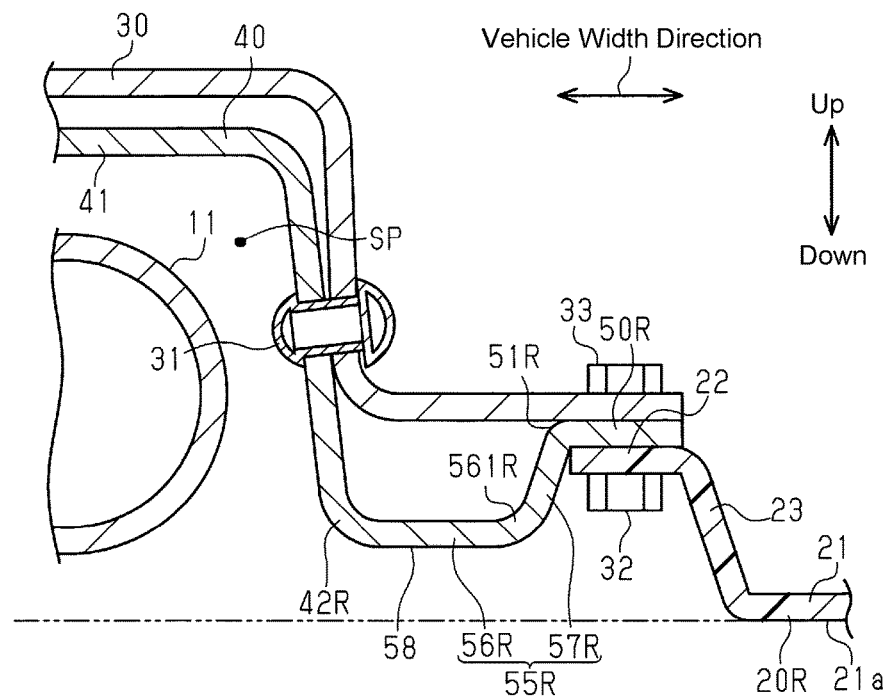
FIG. 4 is a cross-sectional view of a part of a vehicle bottom structure according to another embodiment.

As long as the lower ends 42R, 42L of the covering portion 41 of the heat shield plate 40 are located below the fastened portions of the heat shield plate 40 and the undercover 20R, 20L, the shape of the heat shield plate 40 may be changed as needed. For example, as shown in FIG. 4, the heat shield plate 40 may have a shape in which the lower surface 58 of each first coupling section 56R, 56L is located above the lower surface 21a of the cover body 21.

Figure 5:
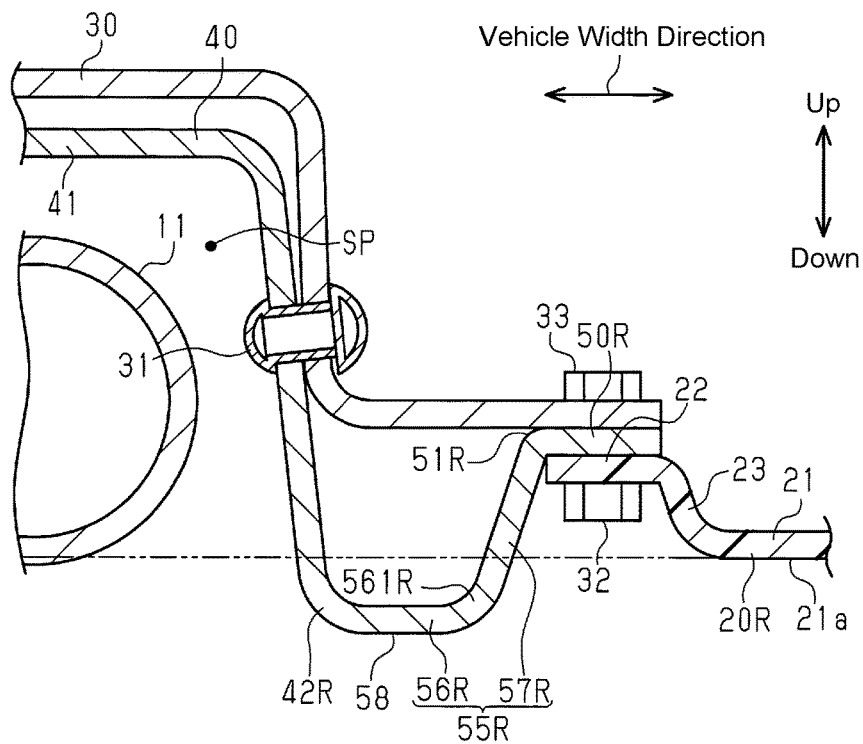
FIG. 5 is a cross-sectional view of a part of a vehicle bottom structure according to another embodiment.

Alternatively, as illustrated in FIG. 5, for example, the heat shield plate 40 may have a shape in which the lower surface 58 of each first coupling section 56R, 56L is located below the lower surface 21a of the cover body 21.

However, if the position of the lower surface 58 and the position of the lower surface 21a are excessively separated from each other in the vertical direction, unevenness of the lower section of the vehicle is increased. This may lower the aerodynamic performance of the vehicle. To avoid this, the position of the lower surface 58 in the vertical direction should be changed with respect to the position of the lower surface 21a in such a range that the reduction in the aerodynamic performance is tolerable.

Figure 6:
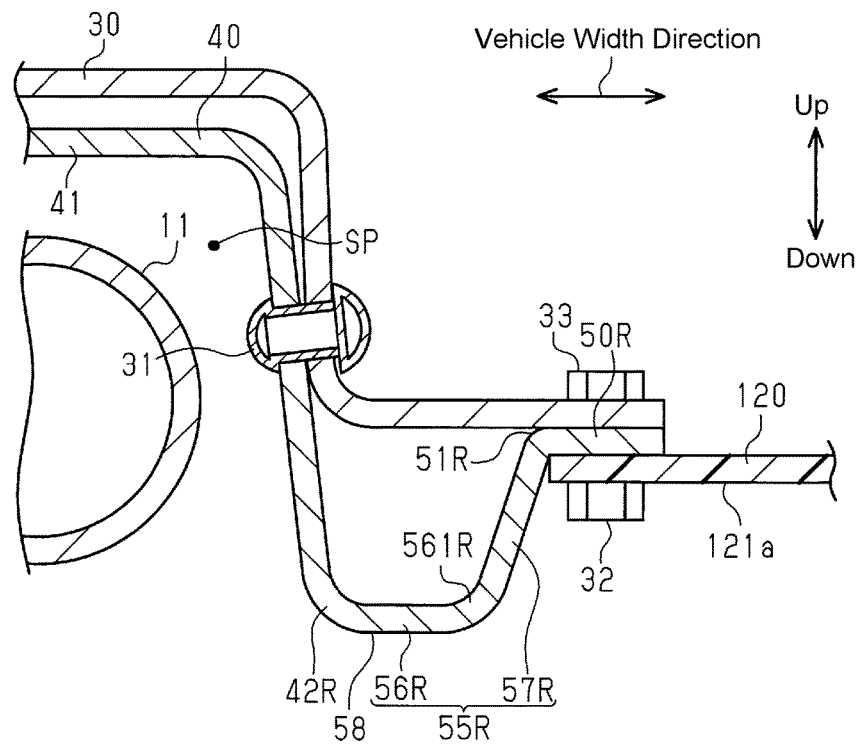
FIG. 6 is a cross-sectional view of a part of a vehicle bottom structure according to another embodiment.

As long as the lower ends 42R, 42L of the heat-shield-plate covering portion 41 are located below the fastened portion of the heat shield plate 40 and the undercover 20R, 20L, the undercover may have any configuration other than the configuration illustrated in the above-described embodiments. For example, with reference to FIG. 6, an undercover 120 may be configured to extend in the vehicle width direction from the portion fastened to the heat shield plate 40. In this case, the lower surfaces 58 of the first coupling sections 56R, 56L of the heat shield plate 40 are located below a lower surface 121a of the undercover 120.

Figure 7:
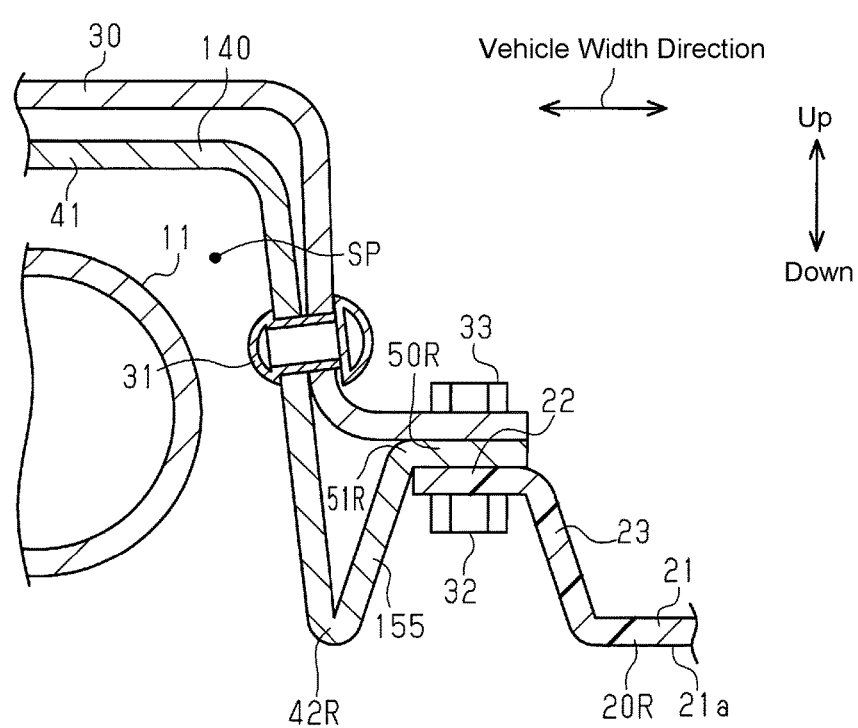
FIG. 7 is a cross-sectional view of a part of a vehicle bottom structure according to another embodiment.

For example, as illustrated in FIG. 7, a heat shield plate 140 may be configured without a flat surface opposed to the road surface 100 between the lower end 42R, 42L of the covering portion 41 and the heat-shield-plate fastened portions 50R, 50L. A heat-shield-plate coupling portion 155 in this case is inclined to become higher from the lower ends 42R, 42L of the covering portion 41 toward the ends 51R, 51L of the heat-shield-plate fastened portions 50R, 50L. In this configuration, the heat-shield-plate coupling portion 155 as a whole corresponds to a section that has a shape that becomes higher toward the undercover in the vehicle width direction.

A fastening member used to fasten the heat shield plate 40 to each undercover 20R, 20L may be any member other than the bolt 32, such as a clip.

The invention claimed is:

1. A vehicle bottom structure comprising:
   a heat shield plate, which is arranged between an exhaust pipe and a vehicle component located above the exhaust pipe; and
   two undercovers that are arranged on opposite sides of the exhaust pipe in a vehicle width direction, wherein
   the heat shield plate includes
      a covering portion, which is arranged along an outer circumference of the exhaust pipe and covers the exhaust pipe,
      two heat-shield-plate fastened portions, each of which is arranged at a position closer to the corresponding one of the undercovers than the covering portion in the vehicle width direction and is fastened to the undercover, and
      two heat-shield-plate coupling portions, each of which couples a corresponding one of lower ends of the covering portion to an end of the corresponding one of the heat-shield-plate fastened portions that is closer to the covering portion in the vehicle width direction, wherein each heat-shield-plate coupling portion includes a section that has a shape that becomes higher toward the corresponding undercover in the vehicle width direction, and
   the heat-shield-plate fastened portions are located above the lower ends of the covering portion.

2. The vehicle bottom structure according to claim 1, wherein each of the lower ends of the covering portion is located below a lower end of a fastening member that fastens the corresponding one of the heat-shield-plate fastened portions to the corresponding one of the undercovers.

3. The vehicle bottom structure according to claim 1, wherein each of the undercovers includes
   a cover body, which has a flat lower surface,
   a cover fastened portion, which is at a position closer to the heat shield plate than the cover body in the vehicle width direction, is arranged above the cover body, and is fastened to the corresponding one of the heat-shield-plate fastened portions, and
   a cover coupling portion, which couples the cover body to the cover fastened portion.

4. The vehicle bottom structure according to claim 3, wherein each of the heat-shield-plate coupling portions includes
   a first coupling section, which extends from the corresponding lower end or the covering portion toward the corresponding undercover in the vehicle width direction and has a flat lower surface, and
   a second coupling section, which couples an end of the first coupling section that is closer to the undercover in the vehicle width direction to an end of the heat-shield-plate fastened portion that is closer to the covering portion in the vehicle width direction.

5. The vehicle bottom structure according to claim 4, wherein
   the lower surface of each of the first coupling sections and the lower surface of each of the cover bodies are both configured to be parallel to a road surface on which the vehicle travels, and the position of the lower surface of each first coupling section is the same as the position of the lower surface of the corresponding cover body in a vertical direction.

\* \* \* \* \*

UNITED STATES PATENT AND TRADEMARK OFFICE
CERTIFICATE OF CORRECTION

PATENT NO. : 10,293,866 B2  
APPLICATION NO. : 15/846759  
DATED : May 21, 2019  
INVENTOR(S) : Kunihiro Hijikata Page 1 of 1

It is certified that error appears in the above-identified patent and that said Letters Patent is hereby corrected as shown below:

In the Specification

In Column 1, Line 23, after "one", delete "or" and insert --of--, therefor.

In Column 4, Line 39, delete "is is" and insert --is--, therefor.

In the Claims

In Column 6, Claim 4, Line 54, after "end", delete "or" and insert --of--, therefor.

Signed and Sealed this
Thirtieth Day of July, 2019

Andrei Iancu
*Director of the United States Patent and Trademark Office*